United States Patent
Wolfson et al.

(10) Patent No.: US 11,580,609 B2
(45) Date of Patent: Feb. 14, 2023

(54) CROP MONITORING TO DETERMINE AND CONTROL CROP YIELD

(71) Applicant: International Business Machines Corporation, Armonk, NY (US)

(72) Inventors: Charles Daniel Wolfson, Austin, TX (US); David Alec Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 16/882,981

(22) Filed: May 26, 2020

(65) Prior Publication Data
US 2021/0374881 A1 Dec. 2, 2021

(51) Int. Cl.
*G06Q 30/00* (2012.01)
*G06Q 50/02* (2012.01)
*G06Q 10/0631* (2023.01)
*A01C 21/00* (2006.01)
*A01B 79/02* (2006.01)
*A01B 79/00* (2006.01)

(52) U.S. Cl.
CPC ........... *G06Q 50/02* (2013.01); *A01B 79/005* (2013.01); *A01B 79/02* (2013.01); *A01C 21/007* (2013.01); *G06Q 10/06314* (2013.01)

(58) Field of Classification Search
CPC .............. G06Q 50/02; G06Q 10/06314; A01B 79/005; A01B 79/02; A01C 21/007
See application file for complete search history.

(56) References Cited

U.S. PATENT DOCUMENTS 5,668,719 A * 9/1997 Bobrov ............... A01M 7/0092
702/2
6,424,295 B1 * 7/2002 Lange ................. A01C 23/007
701/469

(Continued)

FOREIGN PATENT DOCUMENTS

AU 2014307603 B2 * 1/2018 ........... A01D 34/008
WO 2019049048 A1 3/2019

OTHER PUBLICATIONS

Keicher et al., Automatic guidance for agricultural vehicles in Europe, Computers and Electronics in Agriculture vol. 25, Issues 1-2, Jan. 2000, pp. 169-194. https://www.sciencedirect.com/science/article/pii/S0168169999000629 (Year: 2000).*

(Continued)

*Primary Examiner* — Patricia H Munson
*Assistant Examiner* — Uche Byrd
(74) *Attorney, Agent, or Firm* — Edell, Shapiro & Finnan, LLC

(57) ABSTRACT

A method of predicting crop yield includes generating, via a processor, a plurality of vectors representative of growing conditions for a current time period and a plurality of vectors representative of growing conditions for a previous time period. The processor compares the plurality of vectors for the current time to the vectors of the previous time periods for corresponding growing conditions and determines which previous vectors are closest to the current vectors. The plurality of previous time periods are each associated with crop yields. Thus, the processor can determine a crop yield for the current time period for a selected crop producing field and crop type based on crop yields for the closest previous time periods.

18 Claims, 8 Drawing Sheets

(56) References Cited

U.S. PATENT DOCUMENTS

| | | | |
|---|---|---|---|
| 9,074,234 B2 | 7/2015 | Tierney | |
| 10,255,670 B1 | 4/2019 | Wu et al. | |
| 10,452,793 B2 | 10/2019 | Joshi et al. | |
| 2014/0136286 A1* | 5/2014 | Hovis | A01B 69/00 705/7.34 |
| 2016/0290918 A1* | 10/2016 | Xu | G01N 21/359 |
| 2017/0228743 A1 | 8/2017 | Cousins et al. | |
| 2020/0128734 A1* | 4/2020 | Brammeier | G05D 1/0212 |

OTHER PUBLICATIONS

S. Gorthi, "Prediction Models for Estimation of Soil Moisture Content" (2011), All Graduate Theses and Dissertations, 1090, https://digitalcommons.usu.edu/etd/1090, 86 pages.

R. Raman, "The Impact of Genetically Modified (GM) Crops in Modern Agriculture: A Review", GM Crops & Food, 8:4, 195-208, DOI:10.1080/21645698.2017.1413522, (2017), 15 pages.

Disclosed Anonymously, "Grain Yield Monitoring Compensation for Improved Accuracy", IPCOM000245477D, Mar. 11, 2016, 3 pages.

Disclosed Anonymously, "Method to enhance crop yield by means of arlincial intelligence and natural language processing", IPCOM000234020D, Jan. 7, 2014, 4 pages.

Disclosed Anonymously, "Method to recommend type of crop and the best time to plant", IPCOM000234019D, Jan. 7, 2014, 3 pages.

Disclosed Anonymously, "Sustainable Prediction Model for Farming", IPCOM000232313D, Oct. 31, 2013, 11 pages.

"Handbook on Remote Sensing for Agricultural Statistics", Global Strategy, www.gsars.org, 2018, 288 pages.

* cited by examiner

YIELD DATA — 122

| Year | Variety | Yield cwt/acre | Yield T/Ha |
|---|---|---|---|
| Year 6 | Classic | 327 | 36.71318182 |
| Year 8 | Classic | 261 | 29.30318182 |
| Year 10 | Strong Red | 224 | 25.14909091 |
| Year 12 | Classic | 442 | 49.62454545 |

GROWING DEGREE DAYS (GDD) FOR "FIELD A"

TEMPERATURE VECTOR DATA — 124

| Year 1 | Year 2 | Year 3 | Year 4 | Year 5 | Year 6 | Year 7 | Year 8 | Year 9 | Year 10 | Year 11 | Year 12 | Current Year |
|---|---|---|---|---|---|---|---|---|---|---|---|---|
| 286.6389 | 278.2018 | 277.399 | 291.8894 | 281.0368 | 284.318 | 277.8269 | 285.4053 | 283.5951 | 280.304 | 279.1265 | 280.962 | 281.6665 |
| 292.1742 | 280.0823 | 276.645 | 291.9622 | 281.7631 | 280.3448 | 280.157 | 280.2316 | 293.7861 | 279.3279 | 281.4179 | 283.2508 | 290.8637 |
| 294.3438 | 278.7569 | 277.7239 | 285.2707 | 279.28 | 286.4269 | 278.3389 | 283.3338 | 290.0641 | 283.8492 | 282.5461 | 286.9461 | 281.2775 |
| 287.8376 | 279.3971 | 281.5783 | 277.099 | 278.9388 | 289.1403 | 279.3691 | 283.0502 | 287.7899 | 284.8484 | 281.5059 | 291.7128 | 283.5554 |
| 278.1088 | 284.395 | 283.9761 | 282.4213 | 280.1287 | 287.2217 | 278.7339 | 284.1063 | 286.5355 | 279.4207 | 281.6382 | 283.4051 | 285.0567 |
| 280.6431 | 287.956 | 283.1644 | 284.2802 | 284.068 | 284.6982 | 280.3389 | 280.133 | 283.0237 | 280.1637 | 280.6593 | 284.2208 | 285.086 |
| 285.4164 | 285.2574 | 278.7477 | 279.124 | 280.9999 | 278.4839 | 289.1057 | 281.4832 | 280.0666 | 284.7143 | 281.6765 | 285.8151 | 280.0487 |
| 288.1246 | 279.0172 | 281.2627 | 278.6877 | 279.103 | 283.2347 | 290.5387 | 284.7237 | 280.3832 | 284.4677 | 279.4915 | 281.1741 | 286.3458 |
| 288.1866 | 282.5555 | 280.7967 | 281.5089 | 285.7857 | 286.4343 | 291.3192 | 288.3794 | 277.8544 | 283.6199 | 285.1264 | 285.8633 | 287.8639 |
| 287.6635 | 284.8589 | 277.7542 | 284.9583 | 288.278 | 284.8666 | 293.5179 | 282.3782 | 275.678 | 282.35 | 287.0559 | 286.2551 | 286.0715 |
| 290.6231 | 276.5804 | 281.2352 | 282.8566 | 286.7754 | 284.2437 | 285.0711 | 280.5339 | 280.3578 | 281.0909 | 283.6092 | 283.5913 | 277.0769 |
| 289.3132 | 279.2954 | 277.5625 | 284.8818 | 275.9197 | 284.1601 | 279.9594 | 281.9586 | 277.9111 | 282.1006 | 278.5191 | 284.64 | 280.8277 |
| 281.497 | 280.825 | 278.8785 | 280.3103 | 277.3382 | 286.3123 | 279.433 | 287.0584 | 281.704 | 282.4951 | 283.5643 | 280.5798 | 286.4184 |
| 280.6608 | 275.071 | 280.7184 | 286.5088 | 281.9016 | 286.2961 | 284.7604 | 287.3587 | 284.898 | 287.2069 | 282.5706 | 284.867 | 289.4401 |

DAILY SOIL MOISTURE FOR "FIELD A"

SOIL MOISTURE VECTOR DATA — 126

| Year 1 | Year 2 | Year 3 | Year 4 | Year 5 | Year 6 | Year 7 | Year 8 | Year 9 | Year 10 | Year 11 | Year 12 | Current Year |
|---|---|---|---|---|---|---|---|---|---|---|---|---|
| 0 | 1.119725 | 12.43294 | 0 | 2.656284 | 14.31182 | 0 | 11.45634 | 0 | 1.128979 | 9.273233 | 0 | 0 |
| 0 | 8.277552 | 23.04814 | 0 | 3.288792 | 23.34555 | 0 | 11.45634 | 0.019627 | 1.128979 | 9.805725 | 0 | 2.683416128 |
| 0 | 9.992028 | 23.04814 | 19.50419 | 3.288792 | 23.34555 | 0 | 11.45634 | 4.775438 | 1.128979 | 9.805725 | 0 | 16.67959952 |
| 0 | 9.992028 | 23.04814 | 23.8137 | 3.288792 | 26.57111 | 0 | 11.45634 | 6.162291 | 3.482097 | 14.63043 | 0 | 36.1926575 |
| 0 | 9.992028 | 23.04814 | 23.8137 | 3.288792 | 28.57111 | 0.152709 | 12.95761 | 6.388209 | 3.678518 | 17.93858 | 0 | 36.48132807 |
| 0 | 11.56459 | 39.42222 | 24.00465 | 3.288792 | 44.91869 | 0.152709 | 18.45701 | 15.10447 | 3.678518 | 17.93858 | 0 | 36.48132807 |
| 0 | 15.79386 | 40.15725 | 24.00465 | 21.24586 | 44.91869 | 0.152709 | 30.18121 | 15.10447 | 3.678518 | 17.93858 | 0 | 36.48132807 |
| 0 | 15.78386 | 40.15725 | 24.00465 | 26.39754 | 44.91869 | 0.152709 | 30.18121 | 25.73821 | 11.41987 | 17.93858 | 0 | 36.48132807 |
| 0 | 25.84459 | 40.15725 | 24.00465 | 26.39754 | 47.52099 | 0.152709 | 46.32058 | 33.18727 | 27.86841 | 20.40374 | 5.025959 | 36.48132807 |
| 0 | 25.84459 | 44.28547 | 25.28906 | 26.64716 | 50.23291 | 0.152709 | 46.32058 | 33.18727 | 53.62547 | 24.61798 | 10.30387 | 36.48132807 |
| 0 | 25.84459 | 51.69541 | 25.28906 | 27.34844 | 59.4209 | 5.179451 | 46.32058 | 33.18727 | 57.17933 | 26.31377 | 18.30183 | 36.48132807 |
| 0.906677 | 25.84459 | 56.30564 | 25.28906 | 27.34844 | 61.68413 | 5.179451 | 46.32058 | 33.18727 | 57.74045 | 26.31377 | 23.73456 | 36.48132807 |
| 0.906677 | 30.64898 | 58.14104 | 29.6366 | 27.34844 | 61.68413 | 5.179451 | 46.32056 | 33.18727 | 65.31602 | 26.31377 | 23.73456 | 36.48132807 |
| 17.4105 | 50.5064 | 58.83057 | 29.6366 | 27.34844 | 61.68413 | 5.612144 | 48.94422 | 33.18727 | 65.65041 | 27.79219 | 23.73456 | 36.48132807 |
| 21.84967 | 55.04714 | 58.83057 | 33.00584 | 36.44414 | 61.68413 | 6.889007 | 48.94422 | 33.18727 | 73.34124 | 27.79219 | 23.73456 | 36.30185443 |

172 — DISTANCE BETWEEN THE PLURALITY OF VECTORS FOR THE CURRENT TIME PERIOD AND THE PLURALITY OF VECTORS FOR THE PLURALITY OF PREVIOUS TIME PERIODS IS UNDETERMINABLE OR UNSATISFACTORY

176 — DETERMINE ONE OR MORE RATIOS BETWEEN ONE OR MORE CROP YIELDS OF ONE OR MORE TIME PERIODS OF THE PLURALITY OF PREVIOUS TIME PERIODS FOR KNOWN CROP PRODUCING FIELDS

178 — INTERPOLATE THE CROP YIELD FOR THE DESIRED UNKNOWN CROP PRODUCING FIELD FOR THE CURRENT TIME PERIOD BASED ON THE RATIO AND CROP YIELDS FOR KNOWN CROP PRODUCING FIELDS FOR THE CURRENT TIME PERIOD

FIG.6

| Year 1 | Field A | Field B | Field C | Field D |
|---|---|---|---|---|
| Field A | 1 | 1.119496855 | 1.502169705 | 1.223367698 |
| Field B | 0.893258427 | 1 | 1.341772152 | 1.092783505 |
| Field C | 0.665730337 | 0.7452830189 | 1 | 0.8144329897 |
| Field D | 0.8174157303 | 0.9150943396 | 1.227848101 | 1 |

CROP MONITORING TO DETERMINE AND CONTROL CROP YIELD

BACKGROUND

1. Technical Field

Present invention embodiments relate to crop monitoring, and more specifically, to monitoring a planted field and determining and controlling crop yield based on growing conditions of the field and historical vectors of growing conditions of one or more fields.

2. Discussion of the Related Art

Generally, crop yield predictions provide an indication of the predicted performance of a crop being grown in a field. In some instances, crop yield predictions are generated prior to planting a crop to try to determine how a crop might perform in a field based on weather forecasts, soil characteristics, the prior crop grown in the field, etc. Alternatively, crop yield predictions may be generated after planting to try to determine a crop stage (e.g., a comparison to the progression expected by the biologists) and/or to estimate a potential yield at harvest. This form of crop yield prediction may be based on observed characteristics, such as recent weather patterns and/or observations.

The former type of crop prediction (e.g., pre-planting) may be important for growers (e.g., to allow a farm to meet supply/demand trends, maximize field efficiency, etc.), but the latter type of crop prediction (e.g., post-planting) may impact an entire food supply chain. That is, not only are growers interested in estimating yield, but instead, food producers (e.g., bakeries, food production factories, breweries, etc.), commodity traders, crop haulers, supermarkets, and other entities are also interested in estimating yield since it greatly impacts their business. For example, a hauler can optimize operations if it knows when to ramp up for yields and a brewery or bakery might be able to predict and prepare for a potential shortfall or surplus of a key ingredient from a grower who is supplying their operations.

To date, there are many techniques for attempting to manage fields to control and/or predict yield, before and/or after planting. Some techniques use an econometric approach to try to ensure sustainable farming and others try to predict when and what to plant, without focusing on predicting yield after planting. Other techniques utilize sensors to try to monitor specific properties or characteristics of crops (e.g., hardness of grain, soil moisture, metabolic profiling) and try to predict yield based on a specific monitored characteristic. However, in focusing on specific characteristics, these techniques often fail to consider predictions of future conditions (e.g., weather forecasts) and, thus, may not provide accurate, long-range predictions. This may be problematic for businesses that need lead time to adjust to yield conditions. That is, predictions based on daily monitoring may change drastically if conditions change drastically and, thus, such predictions may be problematic for businesses in or related to the food production supply chain. Alternatively, some techniques use machine learning techniques and/or neural networks that may be complicated to implement in farm systems that are often not highly sophisticated.

In view of the foregoing, improved yield prediction techniques that can be quickly and easily implemented are continually desired.

SUMMARY

According to one embodiment of the present invention, a method of predicting crop yield is presented herein. The method may comprise generating, via a processor, a plurality of vectors each including measurements for a corresponding growing condition for a current time period. The method may also include, generating, via the processor, a plurality of vectors each including measurements for a corresponding growing condition for a previous time period and comparing, via the processor, the plurality of vectors for the current time period to the plurality of vectors for the corresponding growing conditions for previous time periods. A plurality of previous time periods closest to the current time period across the plurality of vectors can be determined for each corresponding growing condition. The plurality of previous time periods are each associated with crop yields for each of the growing conditions for one or more crop producing fields and crop types. Thus, the processor can determine a crop yield for the current time period for a selected crop producing field and crop type based on crop yields for the selected crop producing field and crop type for the corresponding growing conditions of the determined plurality of previous time periods.

Among other advantages, predicting crop yield for a planted field based on growing conditions of the field and historical vectors of growing conditions of other fields fuses observational predictions with predictive patterns from historical data to provide an accurate, long-range yield prediction. With these predictions, farm equipment (e.g., watering systems) can also be automatically adjusted to maximize yield and/or maintain a certain yield (or to meet other criteria, such as a harvest date).

In some of the aforementioned present invention embodiments, the time period includes a growing season. Additionally or alternatively, the growing conditions include two or more from a group of temperature, soil moisture, precipitation, irrigation, biological measures, and application of treatments. In at least some instances, the biological measures include biomass, and the treatments include one or more from a group of fertilizer, a treatment for pests, and a treatment for diseases. Still further, in some of the aforementioned present invention embodiments, determining the crop yield for the current time period may include applying weights to the crop yields for the selected crop producing field and crop type for the corresponding growing conditions of the determined plurality of previous time periods. The weighted crop yields can be combined to determine the crop yield for the current time period. Advantageously, weighting the crop yields may allow the techniques presented herein to be easily customized across various crops.

Moreover, in some of the aforementioned present invention embodiments, comparing the plurality of vectors may include determining a distance between the plurality of vectors for the current time period and the plurality of vectors for the plurality of previous time periods. Notably, since the growing conditions are represented as vectors, these comparisons can be processed quickly, without computationally complex operations. This may increase the processing speed of an underlying system performing the techniques presented herein.

Additionally or alternatively, if a desired crop producing field for the current time period is unknown within the plurality of previous time periods, determining the crop yield for the desired unknown crop producing field for the current time period may include determining one or more ratios between one or more crop yields of one or more time periods of the plurality of previous time periods for known crop producing fields. The crop yield for the desired unknown crop producing field for the current time period may then be interpolated based on the ratio and crop yields for known crop producing fields for the current time period. This may ensure that the techniques are applicable and scalable across a wide variety of conditions, fields, and crop types.

According to another embodiment of the present invention, a system for predicting crop yield is presented herein. The system may comprise a network interface unit and a processor configured to execute the method laid out above. As mentioned, predicting crop yield in this manner may provide an accurate, long-range yield prediction that can allow the system to automatically adjust farm equipment (e.g., watering systems) to maximize yield and/or maintain a certain yield date (or to meet other criteria). Additionally, since this method distills a large amount of data into vectors, the method may improve the processing speed of the processor (e.g., a processor of a farm management system) that is typically trying to process massive amounts of data collected by or input into the system.

According to yet another embodiment of the present invention, a computer program product for predicting crop yield is presented herein. The computer program product comprises one or more computer readable storage media having program instructions collectively stored on the one or more computer readable storage media, the program instructions executable by a processor to cause the processor to execute the method laid out above. Thus, the computer program product may achieve the benefits of the system and method laid out above.

BRIEF DESCRIPTION OF THE DRAWINGS

Generally, like reference numerals in the various figures are utilized to designate like components.

FIGS. 3 and 4 depict sample data that may be used to determine crop yield with the techniques presented herein, according to a present invention embodiment.

FIG. 6 is a flow chart illustrating a method for determining crop yield for a particular field when historical vectors are unavailable or unsatisfactory for the particular field, according to a present invention embodiment.

FIG. 7 depicts sample data that may be generated by the method of FIG. 6.

DETAILED DESCRIPTION

Figure 1:
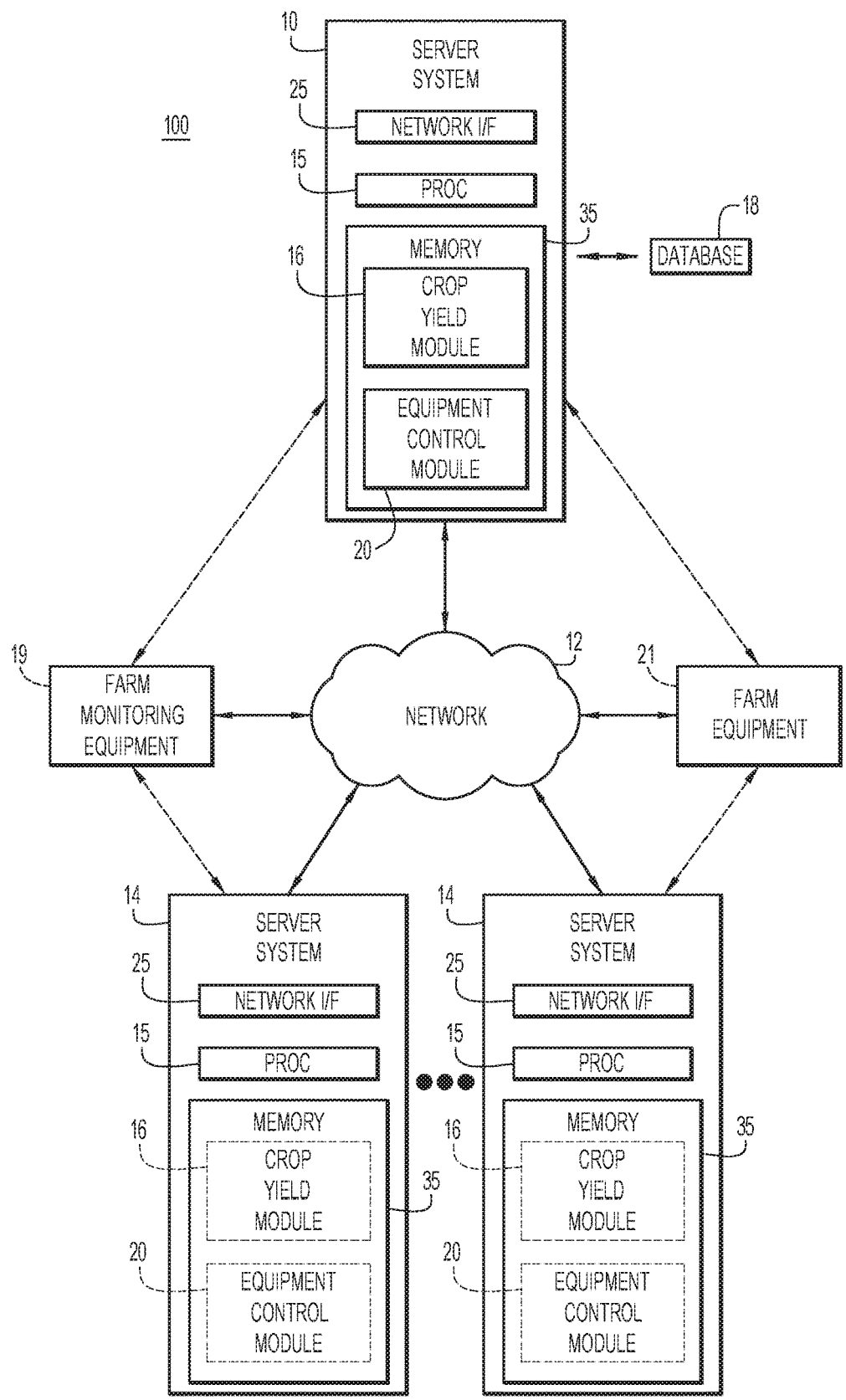
FIG. 1 is a diagrammatic illustration of an example computing environment according to a present invention embodiment.

Generally, this application is drawn to techniques for predicting and controlling crop yield for a planted field based on growing conditions of the field and historical vectors of growing conditions of one or more fields (including or not including the planted field). More specifically, the techniques presented herein generate approximate matches (i.e., "fuzzy matches") between vectors representative of current growing conditions and vectors representative of past growing conditions at fields. By leveraging historical vectors, the techniques presented herein are able to provide accurate yield predications that blend observations with predictions.

As is explained in further detail below, the vectors may account for various growing conditions, such as soil moisture and temperature, and can be weighted differently for different crop types. Using historical data to produce crop yield predictions may provide highly accurate crop yield predictions, which may, among other advantages, improve the efficiency of crop management systems and/or vendor systems associated therewith. Additionally, utilizing vectors to represent growing conditions may vastly increase the speed with which a farm management can process historical data. Notably, historical growing condition data may be generated daily, if not in smaller increments, and, thus, may become quite burdensome over the course of a growing season.

According to one embodiment of the present invention, a method of predicting crop yield is presented herein. The method may comprise generating, via a processor, a plurality of vectors each including measurements for a corresponding growing condition for a current time period. The method may also include, generating, via the processor, a plurality of vectors each including measurements for a corresponding growing condition for a previous time period and comparing, via the processor, the plurality of vectors for the current time period to the plurality of vectors for the corresponding growing conditions for previous time periods. A plurality of previous time periods closest to the current time period across the plurality of vectors can be determined for each corresponding growing condition. The plurality of previous time periods are each associated with crop yields for each of the growing conditions for one or more crop producing fields and crop types. Thus, the processor can determine a crop yield for the current time period for a selected crop producing field and crop type based on crop yields for the selected crop producing field and crop type for the corresponding growing conditions of the determined plurality of previous time periods.

Among other advantages, predicting crop yield for a planted field based on growing conditions of the field and historical vectors of growing conditions of other fields fuses observational predictions with predictive patterns from historical data to provide an accurate, long-range yield prediction. With these predictions, farm equipment (e.g., watering systems) can also be automatically adjusted to maximize yield and/or maintain a certain yield (or to meet other criteria, such as a harvest date).

In some of the aforementioned present invention embodiments, the time period includes a growing season. Additionally or alternatively, the growing conditions include two or more from a group of temperature, soil moisture, precipitation, irrigation, biological measures, and application of treatments. In at least some instances, the biological measures include biomass, and the treatments include one or more from a group of fertilizer, a treatment for pests, and a treatment for diseases. Still further, in some of the aforementioned present invention embodiments, determining the crop yield for the current time period may include applying weights to the crop yields for the selected crop producing field and crop type for the corresponding growing conditions of the determined plurality of previous time periods. The weighted crop yields can be combined to determine the crop yield for the current time period. Advantageously, weighting the crop yields may allow the techniques presented herein to be easily customized across various crops.

Moreover, in some of the aforementioned present invention embodiments, comparing the plurality of vectors may include determining a distance between the plurality of vectors for the current time period and the plurality of vectors for the plurality of previous time periods. Notably, since the growing conditions are represented as vectors, these comparisons can be processed quickly, without computationally complex operations. This may increase the processing speed of an underlying system performing the techniques presented herein.

Additionally or alternatively, if a desired crop producing field for the current time period is unknown within the plurality of previous time periods, determining the crop yield for the desired unknown crop producing field for the current time period may include determining one or more ratios between one or more crop yields of one or more time periods of the plurality of previous time periods for known crop producing fields. The crop yield for the desired unknown crop producing field for the current time period may then be interpolated based on the ratio and crop yields for known crop producing fields for the current time period. This may ensure that the techniques are applicable and scalable across a wide variety of conditions, fields, and crop types.

According to another embodiment of the present invention, a system for predicting crop yield is presented herein. The system may comprise a network interface unit and a processor configured to execute the method laid out above. As mentioned, predicting crop yield in this manner may provide an accurate, long-range yield prediction that can allow the system to automatically adjust farm equipment (e.g., watering systems) to maximize yield and/or maintain a certain yield date (or to meet other criteria). Additionally, since this method distills a large amount of data into vectors, the method may improve the processing speed of the processor (e.g., a processor of a farm management system) that is typically trying to process massive amounts of data collected by or input into the system.

According to yet another embodiment of the present invention, a computer program product for predicting crop yield is presented herein. The computer program product comprises one or more computer readable storage media having program instructions collectively stored on the one or more computer readable storage media, the program instructions executable by a processor to cause the processor to execute the method laid out above. Thus, the computer program product may achieve the benefits of the system and method laid out above.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

An example environment 100 for use with present invention embodiments is illustrated in FIG. 1. Specifically, the environment 100 includes one or more server systems 10, and one or more client or end-user systems 14. Server systems 10 and client systems 14 may be remote from each other and communicate over a network 12. The environment 100 may also include farm monitoring equipment 19, such as moisture sensors, temperature sensors, drones, satellites, etc. (as described in further detail below), and farm equipment 21, such as watering systems (e.g., irrigation systems), treatment systems, etc. that may connect to and communicate with server systems 10 and/or client systems 14, either directly (e.g., via a wired or short-range wireless connection) or indirectly via network 12. However, it is to be understood that the functional division among components of computing environment 100 have been chosen for purposes of explaining present invention embodiments and is not to be construed as a limiting example.

The network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 may, among other tasks, enable users to input data relating to growing conditions that the server systems 10 can use to determine a crop yield for a current time period for a selected crop. Additionally or alternatively, client systems 14 may transmit data collected by/generated by farm monitoring equipment 19 to server systems 10 and/or transmit control signals to farm equipment 21. Still further, in some instances, client systems 14 may generate vectors representative of corresponding growing conditions and transmit the vectors to the server systems 10. The server systems 10 include a crop yield module 16 to predict crop yield based on the data and/or vectors provided thereto. In some instances, the server systems 10 may also include an equipment control module 20 to generate control signals for farm equipment 21; however, the equipment control module 20 may, in some instances, be included entirely on the client systems 14 (and, thus, is illustrated in dashed lines in server systems 20).

A database system 18 may store various information for the analysis (e.g., prediction algorithm parameters, historical yields, historical data, historical vectors, algorithm weights, etc.). The database system 18 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user (e.g., GUI, etc.) or other interface (e.g., command line prompts, menu screens, etc.) to solicit information from users pertaining to the desired data and analysis, and may provide reports including analysis results (e.g., yield prediction, yield ratios, etc.).

Server systems 10 and client systems 14 may be implemented by any conventional or other computer systems preferably equipped with a display or monitor, a base (e.g., including at least one hardware processor 15 (e.g., microprocessor, controller, central processing unit (CPU), etc.), one or more memories 35 and/or internal or external network interfaces or communications devices 25 (e.g., modem, network cards, etc.), optional input devices (e.g., a keyboard, mouse or other input device), and any commercially available and custom software (e.g., server/communications software, crop yield module, equipment control module, browser/interface software, etc.).

Alternatively, one or more client systems 14 may operate as a stand-alone unit. In a stand-alone mode of operation, the client system 14 stores or has access to the data (e.g., growing condition data), and includes crop yield module 16 to predict crop yield based on the data and/or vectors collected by/generated by the client system 14. Moreover, as mentioned, in some instances, a client system 14 can include an equipment control module 20 to generate control signals for farm equipment 21. Either way, the graphical user (e.g., GUI, etc.) or other interface (e.g., command line prompts, menu screens, etc.) can solicit information from a user pertaining to growing conditions and can provide reports including yield predictions.

Modules 16 and/or 20 may include one or more modules or units to perform the various functions of present invention embodiments described below. The various modules (e.g., crop yield module 16 and/or equipment control module 20) may be implemented by any combination of any quantity of software and/or hardware modules or units, and may reside within memory 35 of the server and/or client systems for execution by processor 15 or similar component. Thus, although the methods presented herein are described as being executed by a processor (e.g., a processor executing crop yield module 16 and/or equipment control module 20); this description is merely for clarity/as an example and is not intended to limit the environment in which the techniques presented herein may be executed.

Figure 2:
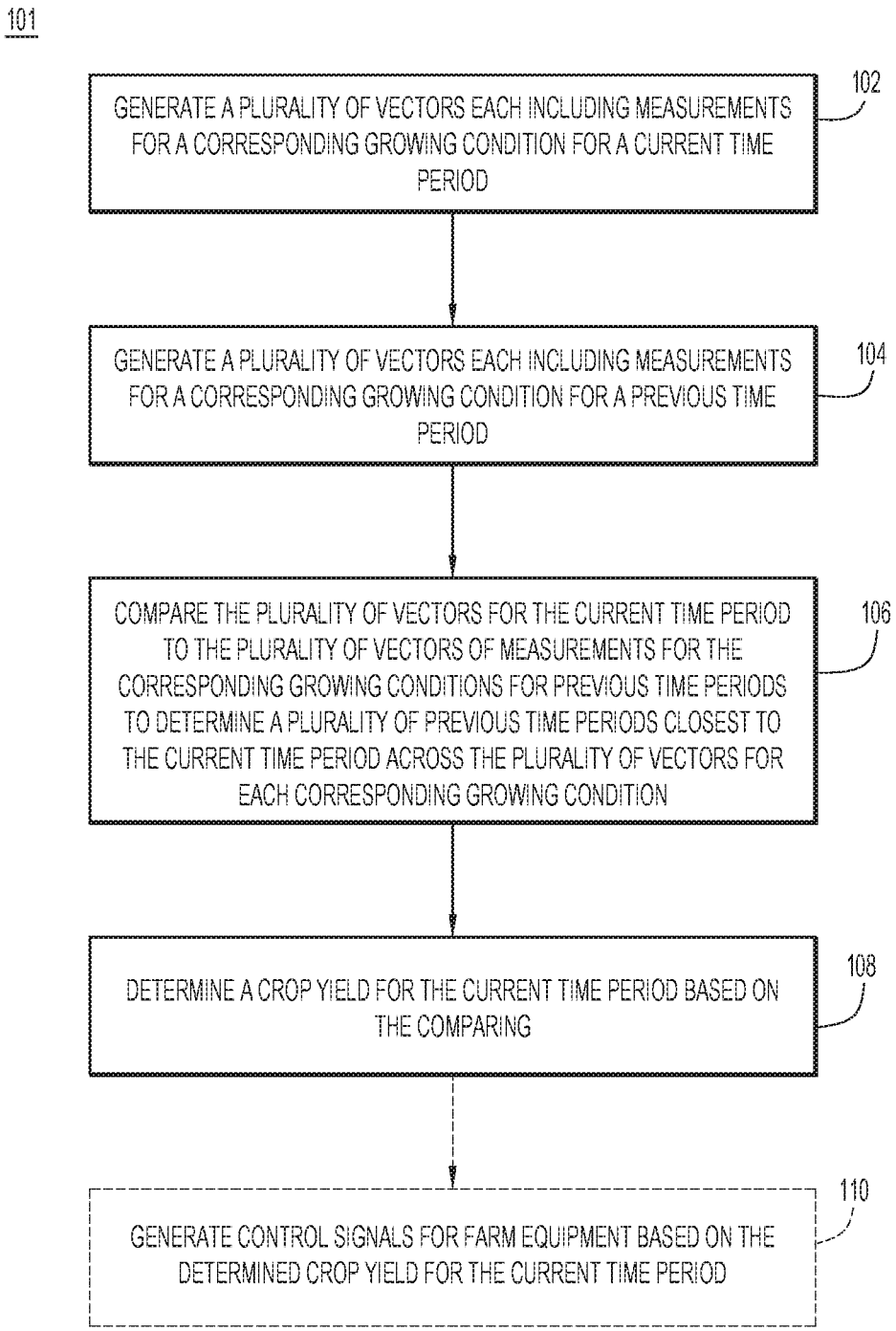
FIG. 2 is a high-level flow chart illustrating a method for determining crop yield, according to a present invention embodiment.

Now turning to FIG. 2, the Figure illustrates a flow chart that depicts a method 101 for predicting crop yield and optionally generating control signals based on the same. Initially, farm monitoring equipment 19 monitors various growing conditions (e.g., in real time) to produce measurements. At step 102, a processor generates a plurality of vectors with measurements for a growing condition for a current period of time (often referred to herein as "current vectors" or the like). Generally, growing conditions can include any information relating to a field or crop that might impact growth of the crop.

For example, growing conditions may include temperature, soil moisture, precipitation, irrigation, biological measures, application of treatments, normalized difference vegetation index (NDVI), and/or evapotranspiration rate. Notably, as used herein, "biological measures" may refer to at least biomass measurements (e.g., the total mass of organisms in a given area or volume) and "crop treatments" may include at least fertilizer treatments (e.g., Nitrogen), pesticide treatments (i.e., treatment for pests), and/or herbicide treatments (i.e., treatment for diseases). Advantageously, since the techniques presented herein can consider any numerically-based growing conditions now known or developed hereafter, the techniques presented herein may be applied to a variety of crop types and field conditions and can also be easily updated to incorporate new developments in crop monitoring/crop analysis.

Each of the growing conditions can be tracked numerically by varying units (e.g., inches or millimeters for precipitation and irrigation, dilution percentages and volumes for pesticides and herbicides, and mass per acre for fertilizer). Thus, the vectors may track numerical data over time, either in increments (e.g., per day, per hour, etc.) or in a cumulative manner. Obviously, vectors for different growing conditions may track different units of measurement; however, in at least some embodiments, the processor normalizes vectors for a specific growing condition to a particular unit of measurement (e.g., inches for precipitation). That is, at step 102, a processor may generate normalized temporal vectors that track growing conditions over time (again, cumulatively or iteratively).

Typically, the data associated with growing conditions may be quite expansive. For example, if a field measures approximately 8 kilometers (km) by 8 kilometers and is segmented into a grid for collecting data on growing conditions (in the manner discussed below), a single field may generate a massive amount of data (e.g., hundreds or thousands of data points per day), with the specific amount depending on the resolution of the grid. In some embodiments, the measurements from this grid are averaged to generate a data point for a vector. Alternatively, sampling techniques now known or developed hereafter may be used to select a representative sample from the grid of measurements to generate a data point for a vector. Still further, all collected data may be converted into a vector. Regardless, by generating vectors, the processor reduces the amount of growing condition data that needs to be processed which, in turn, may expedite further processing associated with the growing condition data.

The growing condition data can be obtained automatically, such as via sensors (e.g., temperature sensors, tensiometers, motion sensors, proximity sensors, etc.) that are distributed or moved throughout a field (e.g., distributed about various sectors of a grid) and/or via data collection equipment carried by a drone (e.g., an unmanned aerial vehicle), satellite, vehicle, etc. For example, a drone might include a camera and images and/or video captured by the camera may be processed to produce crop growth data or other growing condition data. Meanwhile, a satellite may measure NDVI with infrared and red light. Additionally or alternatively, a drone and/or farm equipment (e.g., a tractor, combine, etc.) might carry at least some of the aforementioned sensors (e.g., temperature sensors, tensiometers, etc.) and/or data collection equipment (e.g., cameras). These sensors and data collection equipment are generally depicted as farm monitoring equipment 19 in FIG. 1. Still further, in at least some instances, a user can input data relating to growing conditions into a computing system implementing the techniques presented herein (e.g., through a GUI presented by a client system 14), such as an amount of fertilizer or a volume of a certain dilution of pesticide applied to a field.

In some embodiments, the plurality of vectors generated at 102 includes two or more vectors representative of related growing conditions. That is, the plurality of vectors may be dependent on each other (e.g., a vector representative of irrigation may depend on a vector representative of precipitation). Additionally or alternatively, the plurality of vectors may include two vectors representative of relatively unrelated growing conditions (e.g., soil moisture and biological measures). As one example, a first vector of the plurality of vectors might include measurements for soil moisture (e.g., measured by a tensiometer and/or by a rain gauge that measures precipitation and/or watering from a watering system), a second vector might measure temperature (e.g., in growing degree days, which are a heuristic measurement that represents average warmth above a base temperature for a specific crop on a given day), and a third vector might represent treatment applications (e.g., based on pound or hundredweight per acre (lb/acre or cwt/acre) measurements input into the system by a user).

At step 104, the processor generates a plurality of vectors with measurements for a growing condition for at least one previous period of time (referred to herein as "historical vectors"). Notably, while the vectors generated at 102 may be based on measurements taken during a current growing season, the vectors generated at 104 are for past growing seasons. Additionally, the vectors generated at 104 may relate to a plurality of fields (and may be generated on a per-field basis). That is, in at least some embodiments, the vectors generated at 102 may represent different current growing conditions for one particular field and the vectors generated at 104 may represent different growing conditions observed at any number of fields in past growing seasons (e.g., past years). Alternatively, at 104, the processor might only generate historical vectors for the field on which the current vectors are based (e.g., the field represented by the vectors from 102). Notably, when used herein, the term "growing season" is meant to describe any period of time during which crops may grow, such as a time period lasting the lifespan of a crop, a certain number of days, a certain number of months, or the entire time period within which weather conditions allow crops to grow (e.g., spring to fall in some geographic locations).

Regardless, the vectors generated at 104 may be generated based on the same types of data and in the same manner described above in connection with step 102. For example, a plurality of vectors including temperature measurements may be generated based on temperature measurements obtained by temperature sensors in past years (with vectors for one field over many years or many fields over many years). Notably, although step 104 is depicted after step 102, this order is merely an example and in at least some embodiments, step 104 could be completed prior to step 102.

Figure 4:
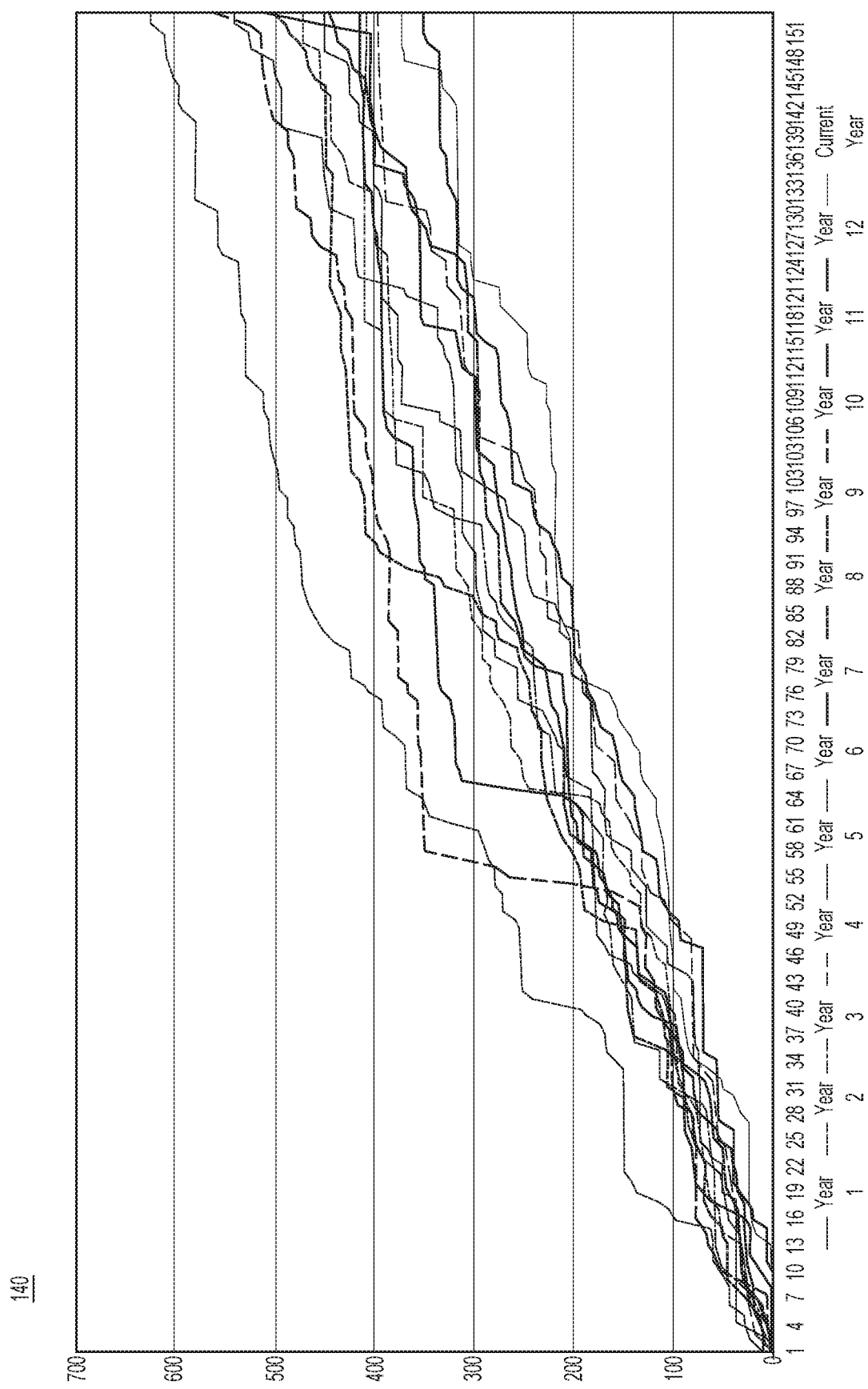

Turning briefly to FIGS. 3 and 4, these figures illustrate representative data that the processor can utilize to generate vectors at steps 102 and 104. Specifically, the tables shown at 124 and 126 illustrate growing degree days (GDD) for field A and daily soil moisture for Field A, respectively. The GDD and daily soil moisture tables organize yearly data into columns and include daily measurements in rows. For brevity, only a small number of days included in a growing season are illustrated in FIG. 3. However, to illustrate a full growing season, FIG. 4 illustrates the soil moisture data, as measured cumulatively over an entire growing season, in a line graph format. Meanwhile, the table shown at 122 illustrates known yields (in cwt/acre and tonne/hectare) for a specific crop variety ("Classic" potato or "Strong Red" potato) grown in a particular field ("Field A"). Although the table shown at 122 only illustrates yields for four years, this is merely representative and the techniques presented herein may utilize yield data for any years for which a vector is generated (as is described further below).

Moreover, as mentioned, the data shown in FIGS. 3 and 4 is merely an example and in different embodiments, this data may take any form and measure any growing condition or combination of growing conditions (in any desirable unit). Likewise, the processor may utilize data for any crop type over any period of time and in any intervals, such as hourly, weekly, etc. Daily data for growing conditions of potatoes is merely an example.

Now turning back to FIG. 2, once the processor generates vectors at 102 and 104, the processor compares the vectors at step 106 to determine a plurality of previous time periods closest to the current time period across the plurality of vectors for each growing condition. That is, the processor finds one or more historical vectors (from 104) that most resemble each vector generated at 102 (current vectors). As an example, if the vectors generated at 102 include a temperature vector and a soil moisture vector, the processor may match the temperature vector to one or more historical temperature vectors from one or more fields and match the soil moisture vector to one or more historical soil moisture vectors from one or more fields. In at least some embodiments, the processor tries to match the current vector with historical vectors from the same field. However, the processor may also try to match the current vector with historical vectors from a plurality of fields (an example of which is described below in connection with FIG. 6). Either way, matching vectors for each growing condition allows yield predictions to be customized for various crop types that might be impacted differently by different growing conditions.

In at least some embodiments, one or more "closest" vectors are found by calculating a Euclidean distance between the current vector and each of the historical vectors for the same growing condition, with the following equation being representative of such a calculation: $d(p, q) = \sqrt{\Sigma_{i=1}^{n}(q_i - p_i)^2}$, where "q" represents a data point from a current vector and "p" represents a data point from a historical vector. Then, the one or more historical vectors that are the closest in terms of Euclidean distance may be determined to be the "closest" to the current vector for a growing condition. However, in other embodiments, the processor may utilize other distance metrics for vector spaces, such as Mahalanobis distance or Chebyshev distance to determine the closest vectors. Regardless, in some embodiments, a predetermined number of vectors may be determined to be the "closest" (e.g., the two smallest Euclidean distances). Alternatively, any vectors within a threshold distance of the current vector may be considered "closest." The threshold may be predetermined or determined dynamically (e.g., on a per-vector basis with statistical techniques).

In at least some instances, the processor may also filter vectors by crop type prior to comparing at 106 (e.g., potato vectors are compared to potato vectors). That is, in at least some embodiments, the techniques may only determine historical vectors to be closest to the current vectors when the historical vectors are for fields that grew a crop that is considered to match a crop being grown in the current field. However, if vectors are matched to other vectors for the same crop type, the crop type match need not be exact. For example, different varieties of the same crop (e.g., "Classic" potato and "Strong Red" potato) may be considered a match or crops from the same general family and/or of the same type (e.g., root vegetables, fiber crops, cereal crops, etc.) may be considered a match. Moreover, in some embodiments, the processor need not consider crop type at 106.

At 108, the processor determines or predicts a crop yield for the current time period based on the vectors selected with the comparing. More specifically, at 108, the processor determines or predicts a crop yield for the current time period based on crop yields from the previous time periods determined to be similar to the current growing conditions (based on comparison of vectors from 106). Additionally or alternatively, at 108, the historical vectors might be used in combination with historical harvest date data (instead of or in addition to yield data) to determine or predict a date at which a harvest period will begin, a date range for the harvest period, and/or other such data relating to harvest. Either way, once the processor identifies historical vectors that are closest to the current vectors (whether from the same field as the current vectors and/or from other fields), the processor can blend yield data (and/or harvest date data) associated with the historical vectors with exponential smoothing techniques to determine the yield (and/or harvest date data) of the current time period. For example, the processor can average the yield data (and/or harvest date data) with weighted or unweighted averaging techniques.

Figure 5:
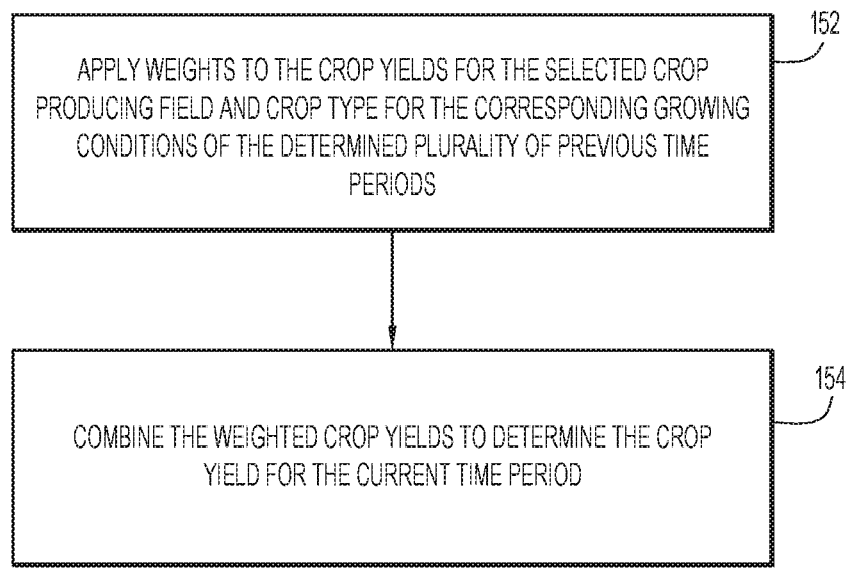
FIG. 5 is a flow chart illustrating a method for determining yield based on historical vectors representative of growing conditions, according to a present invention embodiment.

Specifically, and now turning to FIG. 5, in some embodiments the processor may apply weights to the crop yields for selected fields for the corresponding growing conditions of the determined plurality of previous time periods, as shown at 152. That is, the processor may apply weights to the crop yields associated with the historical vectors determined to be closest to the current vectors for a growing condition. The weights may be determined based on crop type. For example, the weights may be predetermined for different crop types and theses predetermined weights may be stored in memory associated with specific crop types.

As some examples, if the processor is generating vectors for soil moisture and temperature for potato crops, the yield associated with the closest soil moisture vector may be weighted at 10 percent while the yield associated with the closest temperature vector may be weighted at 90 percent. Meanwhile, if the processor is generating vectors for soil moisture and temperature for cereal crops, the yield associated with the closest soil moisture vector may be weighted at 40 percent while the yield associated with the closest temperature vector may be weighted at 60 percent. Still further, if the processor is generating vectors for soil moisture and temperature for canola crops, the yield associated with the closest soil moisture vector may be weighted at 30 percent while the yield associated with the closest temperature vector may be weighted at 70 percent. Each of these weights may be determined based on properties and characteristics of the crops (e.g., sensitivity to moisture and temperature variations) and can be adjusted with any amount of crop type granularity (e.g., per variety, per family of crop, per type of crop, etc.). Thus, advantageously, the techniques presented herein may be customizable across a large variety of crops with minimal computational complexity.

At 154, the processor combines the weighted crop yields to determine the crop yield for the current time period. In fact, although the aforementioned examples only mention a single vector as being the closest for a particular growing condition, it is to be understood that one or more historical vectors may be selected as the closest vectors to a current vector for a current growing condition and the yields of all of the closest vectors may be blended together. For example, if the processor is utilizing the above 10%-90% weighting to determine potato yield based on temperature and soil moisture vectors, the processor may combine the weighted yields from one or more closest vectors as follows: $\Sigma 0.9(t_1+t_{1n})+0.1(m_1+m_n)$, where t is representative of yields associated with historical temperature vectors and m is representative of yields associated with historical moisture vectors. As mentioned above, the "closest" historical vectors may be a predetermined number of closest vectors, any vectors within a threshold distance of the current vector, or one or more historical vectors determined to be closest in some other manner (generally based on a distance metric for a vector space).

Still referring to FIG. 5, but now in combination with FIG. 3, as a more specific example, if a processor determines that a temperature vector from a first year (Year 8) is the closest to a current temperature vector and that a soil moisture vector from a second year (Year 10) is the closest to a current soil moisture vector, the yields from the first and second years (261 cwt/acre and 224 cwt/acre) can be blended with weighted averaging to determine a yield amount for the current field (assuming the current field is growing potatoes or a related crop in this example). Thus, for potatoes, the current yield could be predicted or determined to be 257.3 cwt/acre. However, notably, different crops might produce different yield determinations (due to different weightings). Moreover, as mentioned, different crops might cause the processor to filter historical vectors thereby causing the processor to determine that different historical vectors are closest to the current vectors. Still further, different crops might create different current vectors, further impacting the determination of the closest historical vectors.

Now turning back to FIG. 2, at 110, the processor can generate control signals for farm equipment (e.g., farm equipment 21) based on determined crop yield for the current time period (e.g., by executing equipment control module 20). In some embodiments, the processor may generate control signals that attempt to maximize yield. Alternatively, the processor may generate control signals that maintain yield at a specific output level (so as to avoid a surplus). For example, the processor may generate control signals that adjust current growing conditions to match vectors from a specific year (e.g., to achieve a certain harvest date or certain yield). Thus, in some embodiments, the processor may consider user inputs or selections (e.g., that set targets) when generating control signals. As an example of a control signal, the processor may generate control signals that can control irrigation equipment to increase or decrease watering, for example, if historical vectors associated with the current vector indicate a drought or deluge may be forthcoming.

Now turning to FIG. 6, this figure illustrates a method 170 for determining crop yield for a particular field when the particular field: (a) does not have historical data; or (b) has historical vectors that do not provide a close match to the current vector for the particular field. That is, method 170 enables a processor to determine crop yield for a desired crop producing field for the current time period when the yield of this field is unknown within a plurality of previous time periods (e.g., in accordance with steps 106 and/or 108 of method 101).

Initially, determining the crop yield for the desired unknown crop producing field for the current time period includes, at 172, determining that a distance between the plurality of vectors for the current time period and the plurality of vectors for the plurality of previous time periods is undeterminable or unsatisfactory. For example, if a field has historical vectors but none of the distances between the historical vectors and the current vectors fall within a threshold distance, the plurality of vectors for the plurality of previous time periods may be unsatisfactory. Alternatively, if historical vectors do not exist (e.g., because underlying data does not exist), the plurality of vectors for the plurality of previous time periods may be considered undeterminable.

Still referring to FIG. 6, but now in combination with FIG. 7, at 176, the processor can compare historical yields of various fields to determine yield ratios between the fields. FIG. 7 depicts an example table 190 of yield ratios between four known fields: "Field A," "Field B," "Field C," and "Field D" for a particular growing season (represented on a yearly basis). As can be seen Field A may produce a higher yield than Field B, C, or D and thus, has ratios above 1 as compared to each of these fields (seen in the top row). By comparison, ratios below 1 indicate that a field produces less crops than another field (on a per acreage basis). For example, Field C produces less yield than all three of the other fields and, thus, the third row has ratios that are all below 1. In some embodiments, the ratios represent yield differences between different crops (e.g., different potato varieties, different cereal crops, completely different crops, etc.). Additionally or alternatively, the ratios may represent yield differences between different fields (e.g., regardless of the crop grown in the fields).

At step 178, the processor interpolates the crop yield for the desired unknown crop producing field for the current time period based on the ratios and crop yields for known crop producing fields for the current time period. For example, the current vectors of the desired unknown crop producing field may be compared to historical vectors for Field A, Field B, Field C, and Field D (of FIG. 7) to identify one or more fields that have vectors (e.g., from specific growing seasons, which may be represented as years) closest to the current vectors. Then, a yield may be determined based on historical vectors in the manner described above in connection with methods 101 and/or 150 and the determined yield can be adjusted with the ratios. For example, if Field A is growing a crop that is growing in the field represented by the current vectors, but Field B has historical vectors that are closest to the current vectors, the yield output by methods 101 and/or 150 can be adjusted with the ratio of Field B to Field A (e.g., 0.893258427).

Moreover, in at least some instances, multiple years of ratios may be used to interpolate a crop yield for the current vector. For example, ratios may be averaged across multiple years, perhaps with an unweighted average or by weighting years based on vectors. Additionally or alternatively, multiple ratios can be combined when vectors from multiple different fields are used to determine a crop yield for current vectors (e.g., with weighted or unweighted averaging). Still further, the ratios can be used to validate crop yields enter into a farm system (e.g., to detect for anomalies or errors in data entry).

Figure 8:
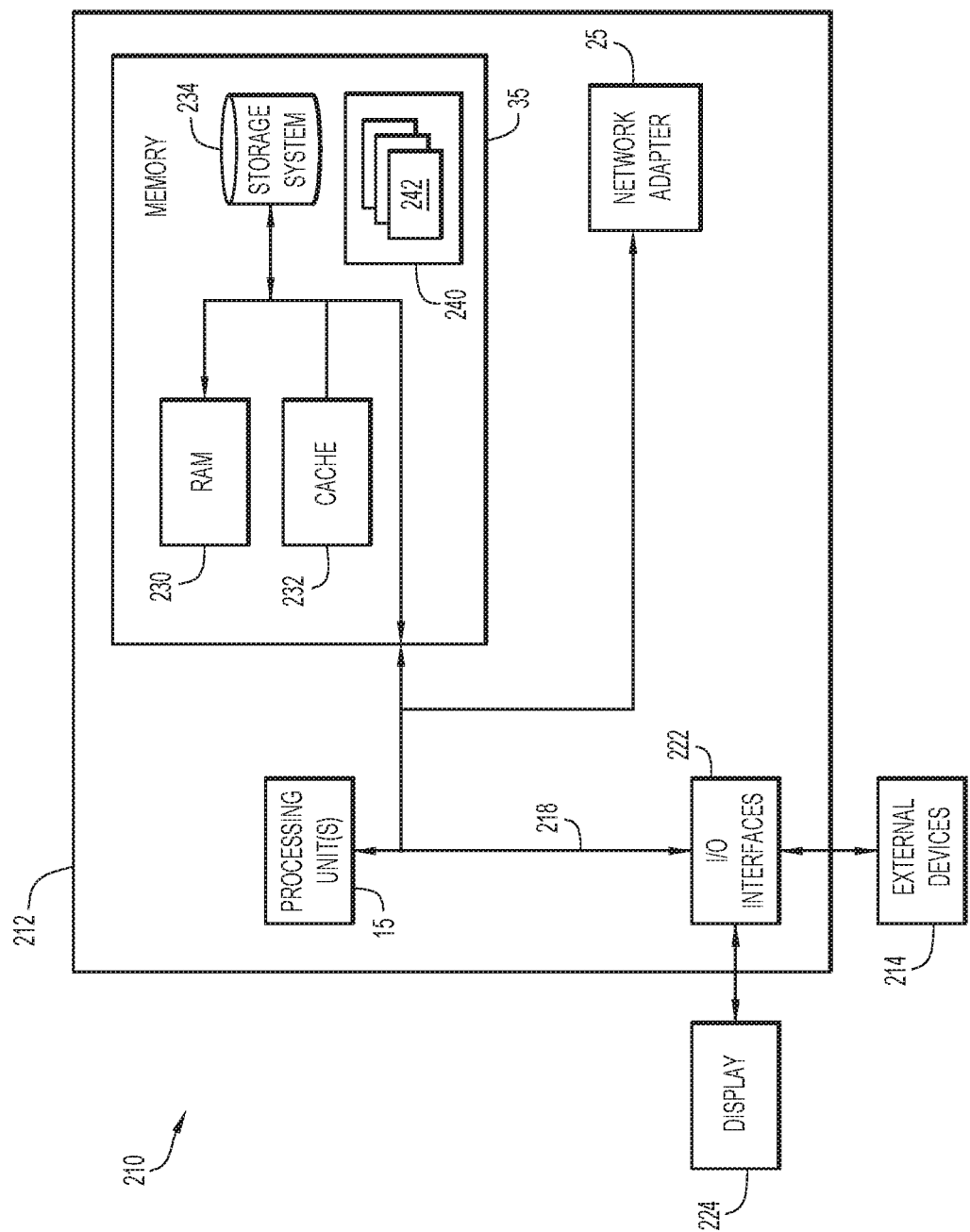
FIG. 8 is a block diagram of an example computing device according to an embodiment of the present invention.

Referring now to FIG. 8, a schematic of an example of a computing device 210 of computing environment 100 (e.g., implementing server system 10 and/or client system 14) is shown. The computing device 210 is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 8, computer system 212 is shown in the form of a general-purpose computing device. The components of computer system 212 may include, but are not limited to, one or more processors or processing units 15 (representative of processors 15 of FIG. 1), a system memory 35 (representative of memories 35 of FIG. 1), and a bus 218 that couples various system components including system memory 35 to processor 15.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 35 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 35 may include at least one program product having a set (e.g., at least one) of program modules that are configured to carry out the functions of embodiments of the invention.

Program/utility 240, having a set (at least one) of program modules 242 (e.g., crop yield module 16 and/or equipment control module 20) may be stored in memory 35 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 25 (representative of network interfaces 25 of FIG. 1). As depicted, network adapter 25 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

It will be appreciated that the embodiments described above and illustrated in the drawings represent only a few of the many ways of implementing embodiments of the crop yield prediction and control techniques presented herein.

The environment 100 of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., crop yield module 16 and/or equipment control module 20) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., .g., crop yield module 16 and/or equipment control module 20) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., prediction algorithms, historical yields, historical data, historical vectors, algorithm weights, etc.). The database system may be implemented by any number of any conventional or other databases, data stores or storage structures (e.g., files, databases, data structures, data or other repositories, etc.) to store information (e.g., prediction algorithms, historical yields, historical data, historical vectors, algorithm weights, etc.). The database system may be included within or coupled to the server and/or client systems. The database systems and/or storage structures may be remote from or local to the computer or other processing systems, and may store any desired data (e.g., prediction algorithms, historical yields, historical data, historical vectors, algorithm weights, etc.).

The present invention embodiments may employ any number of any type of user interface (e.g., Graphical User Interface (GUI), command-line, prompt, etc.) for obtaining or providing information (e.g., yield determinations, historical yields, historical data, historical vectors, algorithm weights, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of predicting crop yield comprising:
generating, via a processor, a plurality of vectors each including measurements for a corresponding growing condition for a current time period;
generating, via the processor, a plurality of vectors each including measurements for a corresponding growing condition for a previous time period;
comparing, via the processor, the plurality of vectors for corresponding growing conditions for the current time period to the plurality of vectors for corresponding growing conditions for previous time periods;
determining, via the processor, a plurality of previous time periods having measurements for the corresponding growing conditions closest in value to measurements for the corresponding growing conditions of the current time period based on distances between the plurality of vectors for the current time period and the plurality of vectors for the previous time periods being within a threshold distance, wherein the plurality of previous time periods are associated with a plurality of crop yields for one or more crop producing fields and crop types, and wherein the corresponding growing conditions for at least two of the determined plurality of previous time periods are closest to different growing conditions for the current time period;
determining, via the processor, a crop yield for the current time period for a selected crop producing field and crop type by combining selected crop yields for the selected crop producing field and crop type for the corresponding growing conditions of the determined plurality of previous time periods; and
controlling, via the processor, operation of farm equipment by generating control signals for the farm equipment based on the determined crop yield for the current time period to adjust operation of the farm equipment to attain a target crop yield.

2. The method of claim 1, wherein the corresponding growing conditions for the current and previous time periods include two or more from a group of temperature, soil moisture, precipitation, irrigation, biological measures, and application of treatments.

3. The method of claim 2, wherein the biological measures include biomass, and the treatments include one or more from a group of fertilizer, a treatment for pests, and a treatment for diseases.

4. The method of claim 1, wherein determining the crop yield for the current time period further comprises:

applying weights to the selected crop yields for the selected crop producing field and crop type for the corresponding growing conditions of the determined plurality of previous time periods; and
combining the weighted crop yields to determine the crop yield for the current time period.

5. The method of claim 1, wherein a desired crop producing field for the current time period is unknown within the plurality of previous time periods, and determining the crop yield for the desired unknown crop producing field for the current time period further comprises:
determining one or more ratios between one or more crop yields of one or more time periods of the plurality of previous time periods for known crop producing fields; and
interpolating the crop yield for the desired unknown crop producing field for the current time period based on the ratio and crop yields for known crop producing fields for the current time period.

6. The method of claim 1, wherein the current and previous time periods include a growing season.

7. A system for predicting crop yield, comprising:
a network interface unit;
a processor configured to:
generate a plurality of vectors each including measurements for a corresponding growing condition for a current time period;
generate a plurality of vectors each including measurements for a corresponding growing condition for a previous time period;
compare the plurality of vectors for corresponding growing conditions for the current time period to the plurality of vectors for corresponding growing conditions for previous time periods;
determine a plurality of previous time periods having measurements for the corresponding growing conditions closest in value to measurements for the corresponding growing conditions of the current time period based on distances between the plurality of vectors for the current time period and the plurality of vectors for the previous time periods being within a threshold distance, wherein the plurality of previous time periods are associated with a plurality of crop yields for one or more crop producing fields and crop types, and wherein the corresponding growing conditions for at least two of the determined plurality of previous time periods are closest to different growing conditions for the current time period;
determine a crop yield for the current time period for a selected crop producing field and crop type by combining selected crop yields for the selected crop producing field and crop type for the corresponding growing conditions of the determined plurality of previous time periods; and
control operation of farm equipment by generating control signals for the farm equipment based on the determined crop yield for the current time period to adjust operation of the farm equipment to attain a target crop yield.

8. The system of claim 7, wherein the corresponding growing conditions for the current and previous time periods include two or more from a group of temperature, soil moisture, precipitation, irrigation, biological measures, and application of treatments.

9. The system of claim 8, wherein the biological measures include biomass, and the treatments include one or more from a group of fertilizer, a treatment for pests, and a treatment for diseases.

10. The system of claim 7, wherein in determining the crop yield for the current time period, the processor is further configured to:
apply weights to the selected crop yields for the selected crop producing field and crop type for the corresponding growing conditions of the determined plurality of previous time periods; and
combine the weighted crop yields to determine the crop yield for the current time period.

11. The system of claim 7, wherein a desired crop producing field for the current time period is unknown within the plurality of previous time periods, and, in determining the crop yield for the desired unknown crop producing field for the current time period, the processor is further configured to:
determine one or more ratios between one or more crop yields of one or more time periods of the plurality of previous time periods for known crop producing fields; and
interpolate the crop yield for the desired unknown crop producing field for the current time period based on the ratio and crop yields for known crop producing fields for the current time period.

12. The system of claim 7, wherein the current and previous time periods include a growing season.

13. A computer program product for predicting crop yield, the computer program product comprising one or more computer readable storage media having program instructions collectively stored on the one or more computer readable storage media, the program instructions executable by a processor to cause the processor to:
generate a plurality of vectors each including measurements for a corresponding growing condition for a current time period;
generate a plurality of vectors each including measurements for a corresponding growing condition for a previous time period;
compare the plurality of vectors for corresponding growing conditions for the current time period to the plurality of vectors for corresponding growing conditions for previous time periods;
determine a plurality of previous time periods having measurements for the corresponding growing conditions closest in value to measurements for the corresponding growing conditions of the current time period based on distances between the plurality of vectors for the current time period and the plurality of vectors for the previous time periods being within a threshold distance, wherein the plurality of previous time periods are associated with a plurality of crop yields for one or more crop producing fields and crop types, and wherein the corresponding growing conditions for at least two of the determined plurality of previous time periods are closest to different growing conditions for the current time period;
determine a crop yield for the current time period for a selected crop producing field and crop type by combining selected crop yields for the selected crop producing field and crop type for the corresponding growing conditions of the determined plurality of previous time periods; and
control operation of farm equipment by generating control signals for the farm equipment based on the determined crop yield for the current time period to adjust operation of the farm equipment to attain a target crop yield.

14. The computer program product of claim 13, wherein the corresponding growing conditions for the current and previous time periods include two or more from a group of temperature, soil moisture, precipitation, irrigation, biological measures, and application of treatments.

15. The computer program product of claim 14, wherein the biological measures include biomass, and the treatments include one or more from a group of fertilizer, a treatment for pests, and a treatment for diseases.

16. The computer program product of claim 13, wherein the program instructions executable to cause the processor to determine the crop yield for the current time period further comprise program instructions executable to cause the processor to:
apply weights to the selected crop yields for the selected crop producing field and crop type for the corresponding growing conditions of the determined plurality of previous time periods; and
combine the weighted crop yields to determine the crop yield for the current time period.

17. The computer program product of claim 13, wherein a desired crop producing field for the current time period is unknown within the plurality of previous time periods, and the program instructions executable to cause the processor to determine the crop yield for the desired unknown crop producing field for the current time period further comprise program instructions executable to cause the processor to:
determine one or more ratios between one or more crop yields of one or more time periods of the plurality of previous time periods for known crop producing fields; and
interpolate the crop yield for the desired unknown crop producing field for the current time period based on the ratio and crop yields for known crop producing fields for the current time period.

18. The computer program product of claim 13, wherein the current and previous time periods include a growing season.

* * * * *